United States Patent
Berggren et al.

(10) Patent No.: US 6,737,767 B2
(45) Date of Patent: May 18, 2004

(54) SYNCHRONOUS COMPENSATION

(75) Inventors: Bertil Berggren, Vasteras (SE); Mons Hölleland, Vasteras (SE); Mats Leijon, Vasteras (SE); Maria Lundmark, Vasteras (SE); Ole-Morten Midtgård, Oslo (NO); Bengt Rothman, Vasteras (SE); Eivind Sande, Oslo (NO); Marco Sipi, Vasteras (SE); Roald Sporild, Vettre (NO); Kirsti S. Svensen, Borgen (NO)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 10/239,883

(22) PCT Filed: Apr. 5, 2001

(86) PCT No.: PCT/SE01/00746

§ 371 (c)(1),
(2), (4) Date: Jan. 24, 2003

(87) PCT Pub. No.: WO01/78215

PCT Pub. Date: Oct. 18, 2001

(65) Prior Publication Data

US 2003/0146731 A1 Aug. 7, 2003

(30) Foreign Application Priority Data

Apr. 6, 2000 (SE) .............................. 0001272

(51) Int. Cl.$^7$ ............................................. H02K 7/14
(52) U.S. Cl. ..................... 310/51; 310/60 R; 310/61; 310/54
(58) Field of Search ............................... 310/68 C, 51, 310/54, 60 R, 61–65

(56) References Cited

U.S. PATENT DOCUMENTS

| 4,922,147 | A | * | 5/1990 | Sismour et al. ............... 310/61 |
| 5,701,044 | A | * | 12/1997 | Emshoff et al. ............... 310/54 |
| 5,877,577 | A | * | 3/1999 | Ishizaki et al. ............. 310/261 |
| 5,998,901 | A | * | 12/1999 | Kawabata et al. .......... 310/114 |
| 6,297,573 | B1 | * | 10/2001 | Roth-Stielow et al. .... 310/68 C |

FOREIGN PATENT DOCUMENTS

| WO | 9834312 | 8/1998 |
| WO | 9917427 | 4/1999 |
| WO | 9917429 | 4/1999 |
| WO | 9929013 | 6/1999 |

* cited by examiner

*Primary Examiner*—Thanh Lam
(74) *Attorney, Agent, or Firm*—Oblon, Spivak, McClelland, Maier & Neustadt, P.C.

(57) ABSTRACT

For a method of operating of a synchronous compensator including a rotating electric machine including a rotor and a stator with at least one winding with a solid insulation enclosing the electric field, relevant parameters for temperature conditions in the rotor are determined, and during over-excited operation, to temporarily enlarge the field of operation of the synchronous compensator, cooling of the rotor is forced depending on a rotor temperature value determined from the parameters. The synchronous compensator measures parameters relevant for the temperature conditions of the rotor. A mechanism is also provided to force the cooling of the rotor depending on rotor temperature values determined from the parameters during over-excited operation of the electric machine.

19 Claims, 4 Drawing Sheets

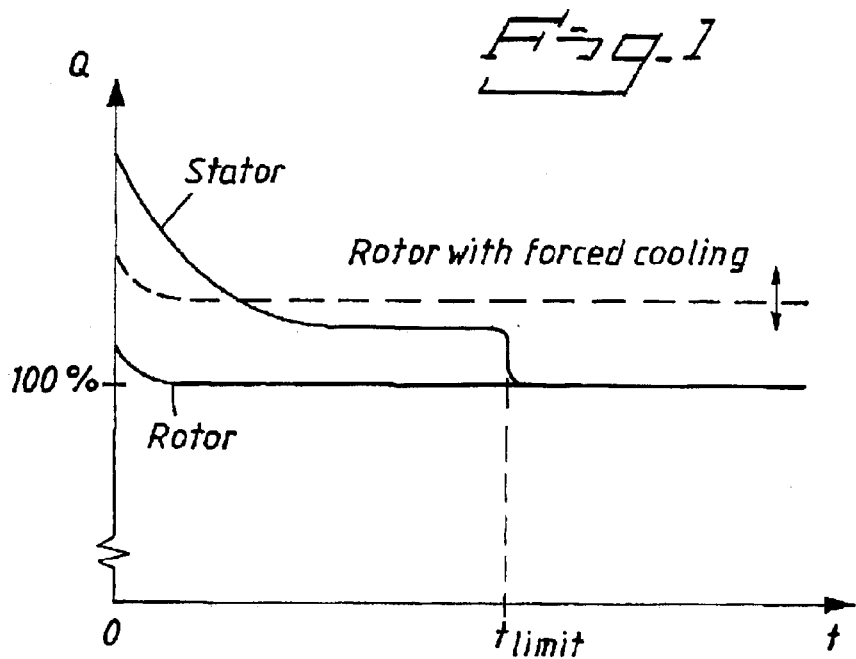
Fig. 1
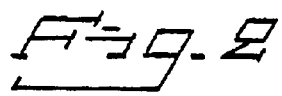
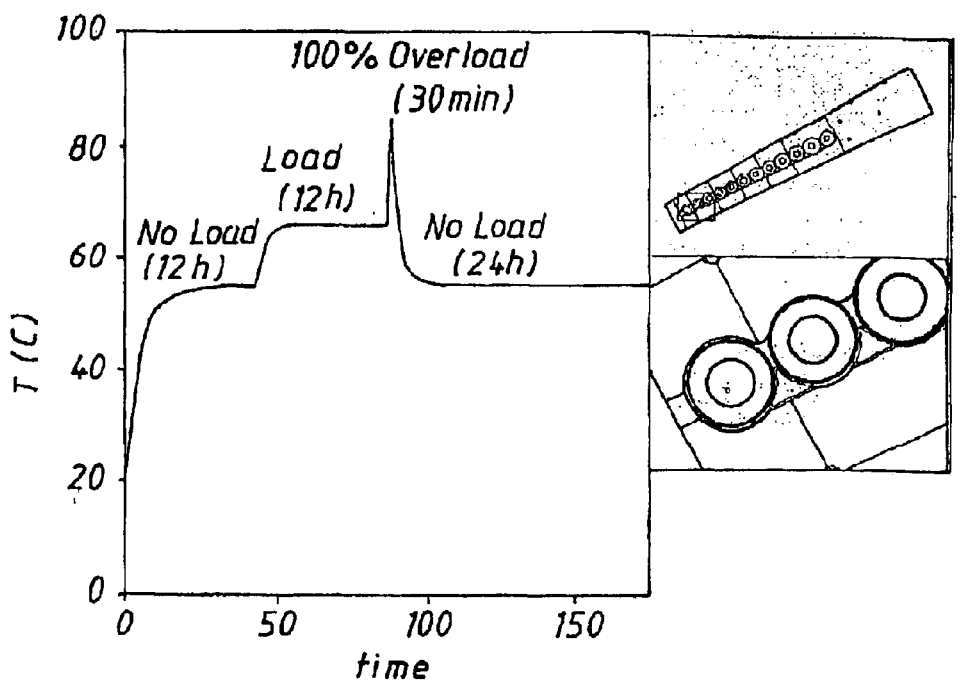

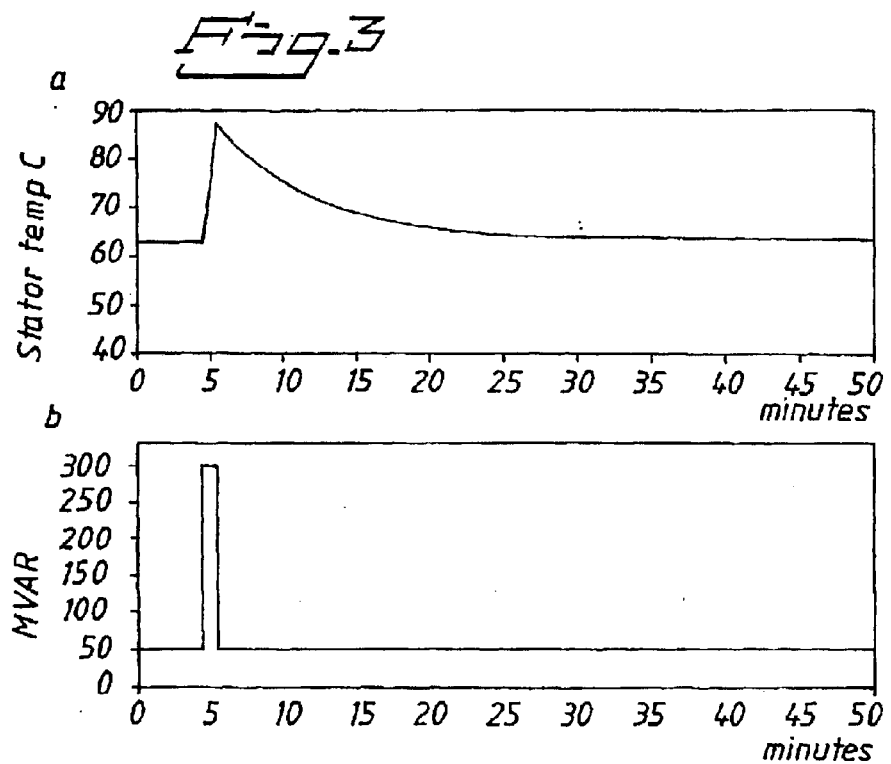
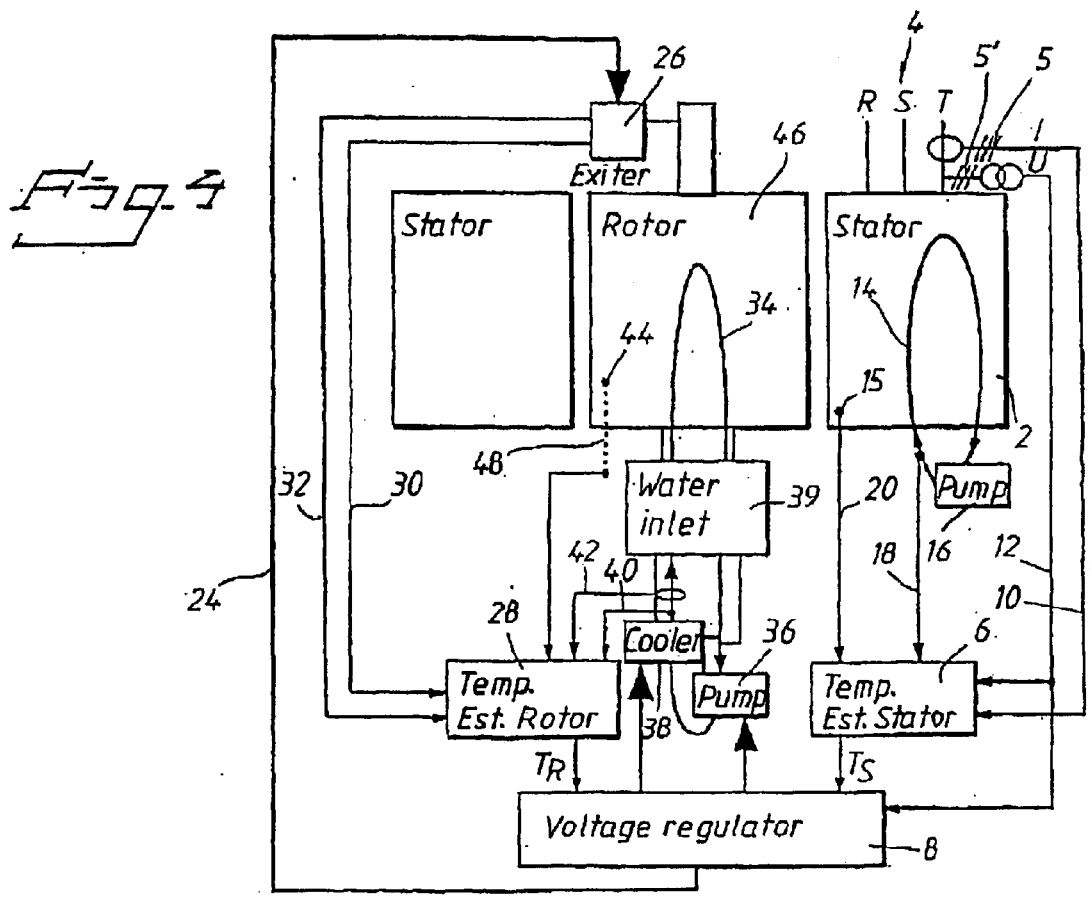

SYNCHRONOUS COMPENSATION

TECHNICAL FIELD

The present invention relates to a method for operation of a synchronous compensator comprising a rotating electrical machine with rotor and stator with at least one winding with solid insulation enclosing the electrical field. The invention also relates to such a synchronous compensator with a measuring device to measure parameters relevant for the temperature conditions in the rotor.

BACKGROUND

Reactive power occurs almost always in electric power systems for alternating current transmission. Many loads consume not only active power but also reactive power, and to stabilize the voltage on the mains, the consumption of reactive power must be compensated for by production of reactive power. Under certain circumstances long high voltage transmission lines will also produce reactive power and require compensation to avoid raised transmission voltage.

To compensate such consumption or production of reactive power one can use static power compensating equipments (SVC) or synchronous compensators. The advantages of either of these techniques are discussed in e.g. the document WO 97/45922.

Synchronous machines designed with so-called cable technology, with at least one winding made of a flexible high voltage cable with solid insulation, have proven to be especially advantageous as synchronous compensators, see the above WO 97/45922 and WO 98/34312. Such machines can be designed for such high voltages, up to 800 kV, that they can be directly connected to any mains. This eliminates the cost of transformers as well as the reactive power consumption of the transformers themselves. A larger percentage of the reactive power produced can thus be fed to the mains. A synchronous compensator made with cable technology will also withstand higher overloads than conventional synchronous compensators, for short time and longer time overloads. This is primarily a result of the time constants for heating of the stator are longer due to the electric insulation of the stator winding. Further, while the power losses in conventional synchronous compensators are mainly losses in the conductors, these losses are smaller in synchronous compensators made with cable technology where the main part of the losses are core losses. Since core losses occur at ground potential they can be easier cooled away.

The part of the stator which is most critical from the temperature point of view seems to be the cable, and in the following the term stator temperature refers to the temperature of the cables.

The aim of the present invention is to provide a new technique utilizing said advantageous properties of machines of the actual kind to temporarily extend the power range for synchronous compensators with a rotating electric machine of this type.

DISCLOSURE OF THE INVENTION

The aim is fulfilled with a method and a synchronous compensator of the type described in the introductory portion and having the characteristics of claims 1 and 10, respectively.

With the method according to the invention, the cooling of the rotor is forced when the synchronous compensator is operating over-excited, depending on a value of the rotor temperature determined from measured parameters relevant for said rotor temperature. The forced cooling will be initiated when the rotor temperature tends to become too high, and in this way it is possible to utilize the advantageous thermal properties of the stator of a synchronous compensator made with cable technology, without the rotor of the machine restricting the possibility to utilize the overload capacity of the stator.

According to an advantageous embodiment of the method according to the invention, the machine is designed to permit overload also at under-excited operation. This allows a temporary extension of the range of operation also for under-excited operation. In this way, the range of operation for a synchronous compensator according to the invention can be temporarily extended from stationary +/−100% to e.g. +/−200% for a duration of the order of 30 minutes to 1 hour by forced cooling of the rotor and by dimensioning the machine to get $1/x_q=2$, where $x_q$ is the quadrature-axis synchronous reactance, i.e. in the direction of the pole aperture, in per unit based on the rating of the machine. Operators of power systems often specify that considerable overload capability may be needed for 15–20 minutes or more during operation disturbances, since that would allow the operator to take measures such as mains switches, start of gas turbines to ensure continuous operation with a minimum of disturbances for the customers.

According to another advantageous embodiment of the method according to the invention, parameters relevant for the temperature conditions in the stator are determined, and during over-excited and under-excited operation, the inductor current is reduced if a critical stator temperature is exceeded. In this way one can prevent the stator temperature (primarily the temperature of the winding) getting too high while operating the synchronous compensator in the extended range of operation.

According to still another advantageous embodiment of the method according to the invention, the machine is designed for a large short-circuit power. The result of such a construction is that the synchronous reactances become small, making it possible to extend the range of operation of the synchronous compensator for under-excited operation.

According to still another advantageous embodiment of the method according to the invention, the inductor current is reduced if the temperature value of the rotor exceeds a predetermined first limit value, and the cooling of the rotor is forced if the temperature value of the rotor exceeds a predetermined second limit value lower than the first limit value. Likewise, if the stator temperature exceeds a maximal permitted upper temperature limit of the stator, the inductor current is reduced.

According to another advantageous embodiment of the method according to the invention, the temperature value of the rotor is calculated from one or more of the parameters inductor current, inductor voltage, directly measured temperature on the rotor, temperature of the cooling medium and flow velocity of the cooling medium. There are thus several ways to determine the rotor temperature value which controls the forced cooling of the rotor. This value can be estimated calculated from the inductor current and inductor voltage. The temperature directly measured at a critical point on the rotor may be used to represent the rotor temperature. Alternatively both the calculated rotor temperature value and the actually measured value may be utilized as rotor temperature value, e.g. by forming a mean value, and the temperature and flow of the cooling medium can be utilized to get a more reliable rotor temperature value. Specific advantages are gained by using directly measured rotor (or stator) temperatures instead of values estimated from currents and voltages. Thus it is possible to take account of the initial temperature of the machine at the beginning of the overloading. If the machine has been idling and consequently is "cold" when the overloading begins, it will be able to withstand more overload during longer time until maximum allowable temperature limits are reached. In this way one can reduce the conservative determining of limits for stator and rotor currents, which normally is applied in known technology.

To utilize the possibility of a considerably enlarged range of operation during under-excited operation, means are provided to permit negative inductor current. These means can comprise a static exciter with two bridges. By these means the range of under-excited operation may be extended to $-1/x_q$ in per unit based on the rating of the machine and at nominal voltage without risk of exceeding the stability limit of the machine. $x_q$ in unitary values based on the rating of the machine refers to the crosswise synchronous rectance. According to an advantageous embodiment of a synchronous compensator according to the invention, a temperature estimator is provided to estimate a value of the stator temperature from one or more of the parameters stator current, stator voltage, directly measured sheet iron temperature of the stator, temperature of the stator cooling medium or flow velocity of the stator cooling medium. This makes it possible to monitor that the stator temperature, (primarily the temperature of the stator winding), does not become too high.

According to other advantageous embodiments of a synchronous compensator according to the invention, the forced cooling system is designed to force cooling of the rotor by lowering the temperature of the cooling medium, alternatively by increasing the flow of cooling medium. This offers two practical ways to realize the forced cooling.

According to still another advantageous embodiment of the synchronous compensator according to the invention the cooling medium is a liquid, preferably water. In liquid cooling the cooling medium can be directed towards the thermally critical points, permitting optimised cooling. Such directed cooling flow is not easily realized with gas or air cooling, why such cooling systems have to be oversized.

According to yet other advantageous embodiments of the synchronous compensator according to the invention, a wireless communication equipment is provided to transmit measured values from temperature gauges located on the rotor to the temperature estimator. The communication equipment is preferably arranged to transmit the measured values from temperature gauges on the rotor by so-called Bluetooth technique. Such a Bluetooth wireless transmission is insensitive to interference, and well suited for reliable transmission of measured data in highly disturbed environments, at the same time having such a short range that it is no source of disturbance for the surroundings.

According to still another advantageous embodiment of the synchronous compensator according to the invention, the winding comprises a flexible cable with an electrically conductive core surrounded by an insulating system of two semiconductive layers with intermediate solid insulation. In this way the electric field is substantially enclosed in the winding. The potential of the external semiconductive layer can then be substantially kept at ground potential, with resulting obvious advantages.

DESCRIPTION OF FIGURES

In the following the invention will be described in greater detail with reference to the enclosed figures, in which FIG. 1 shows qualitatively the permitted overload as a function of the time, for the stator and for the rotor with different cooling, FIG. 2 shows how the temperature in a cable adjacent to the air gap varies during a load cycle characterized by a relatively long time of overload, FIG. 3 shows how the temperature in a cable adjacent to the air gap varies during a load cycle characterized by a relatively short time of overload, FIG. 4 shows a general view of an embodiment of the synchronous compensator according to the invention.

DESCRIPTION OF EMBODIMENTS

Figure 5:
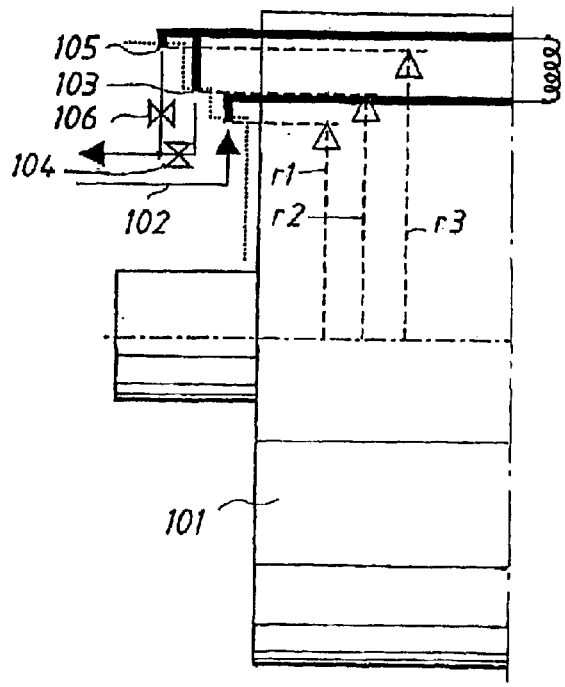
FIG. 5 shows one schematic example of how forced cooling may be realized.

FIG. 1 shows quantitatively the permitted overload as a function of the time for a stator with the winding made with so-called cable technology, and corresponding curves for the rotor with different cooling. As was discussed above, a stator with the winding made by cable technology has considerably improved overload capacity compared to conventionally made stators. The good inherent overload capacity of the stator is illustrated in FIG. 1 by the slow decline of the stator graph from time t=0 and forward. Rotating electric machines with a stator winding made with cable technology with the solid insulation made from so-called XLPE are today dimensioned for a temperature maximum at nominal load of 70° C., but operation at stator temperatures up to 90° C. can be acceptable for a number of hours.

The 100% level in the diagram represents the rated power of the actual machine. $t_{limit}$ in FIG. 1 denotes the prescribed maximum permitted time for operation of the machine at the overload level just before $t_{limit}$. As an example, if this overload level is 50% overload, it would lead to a stator temperature of typically 80° C. If it has then been prescribed that the machine must not be operated with a stator temperature of 80° C. for longer time than 24 hours, $t_{limit}$ is equal to 24 hours.

The thermal time constant of the rotor is considerably shorter than that of the stator, as is shown by the graph for the rotor, which as shown declines quickly to a constant level determined by the cooling of the rotor as will be further discussed below.

In FIG. 2 is shown at the upper right a section of a stator core with a stator slot delimited by stator teeth and containing a winding of high voltage cable, and below that in an enlarged scale the winding turns closest to the air gap. To the left in FIG. 2 an example is shown of how the temperature in a cable adjacent to the air gap varies when the load of an actual machine is varied. At time t=0 the machine is connected idling to the mains. The machine has the same temperature as the surroundings, about 20° C., when it is connected. The idling losses will heat the machine to slightly above 50° C. After 12 hours the load is increased in one step to the rated power. The losses will then increase and raise the temperature to slightly above 60° C. After another 12 hours the load is increased in one step from rated load to twice the rated load, i.e. to 100% overload. As shown in FIG. 2 the temperature has after 30 minutes not reached 90° C. After 30 minutes with 100% overload the load is reduced in one step to idling and the temperature decreases. By dimensioning the rotor cooling system to keep the rotor temperature below critical value with forced cooling, an overload of 100% during 30 minutes of over-excited operation can be accepted.

FIG. 3 shows another example of operation of a machine where the demand for overload is considerably higher but with shorter duration than for the machine of FIG. 2. The graph "a" at the upper part of FIG. 3 shows how the temperature in a cable adjacent to the air gap varies with varying load. The graph "b" in the lower part of FIG. 3 shows the variation of the load. At time t=0 the machine is operated at rated power (50 MVAr) and the temperature is slightly above 60° C. At time 5 minutes, the load is increased in one step from rated load to 6 times rated load (300 MVAr), i.e. 500% overload. One minute later the load is reduced in one step from six times rated load back to rated load, see graph "b". As seen from graph "a" in FIG. 3 the temperature during that whole load cycle never exceeds 90° C. By dimensioning the rotor cooling to keep the rotor temperature below critical value 500% overload will thus be acceptable during one minute at over-excited operation.

FIG. 4 shows principally one embodiment of the synchronous compensator according to the invention with a stator 2 provided with a stator winding of high voltage cable. The machine is directly connected at 4 to a mains.

Measurement signals representing the stator current I and stator voltage U are taken from each phase over transformers 5, 5' and fed to a temperature estimator 6 over wires 10, 12. The voltage signal is also fed to the voltage regulator unit 8. The cooling system circuit for the stator and its pump are shown at 14, 16. Date representing flow and temperature of the cooling medium in the stator cooling circuit 14 are also fed to the temperature estimator 6 by a connection 18. Measurement values from temperature gauges 15 located on the stator 2 to measure the temperature of e.g. the plates are also fed to the temperature estimator 6 by the connection 20. From these input values the temperature estimator 6 determines a critical stator temperature value $T_S$ which is fed to the voltage regulator unit 8.

The aim of this stator temperature determination is to monitor that primarily the cables of the stator do not become too heated. If the stator temperature reaches a predetermined upper limit the inductor current is reduced as will be described below. The stator temperature value is not used to control the rotor cooling.

The inductor current is controlled by the voltage regulator unit 8 over the control connection 24 to the exciter 26 as shown in FIG. 4. Signals representing inductor current and inductor voltage are fed to a rotor temperature estimator 28 by the wires 30,32.

The cooling circuit of the rotor comprising pump, cooler and water inlet is shown at 34, 36, 38, 39. The temperature of the cooling medium, usually water, as well as the water flow in the circuit 34 is measured and fed at 40, 42 to the rotor temperature estimator 28. There are also temperature gauges schematically shown at 44 on the rotor 46. Measured values from the gauge 44 are fed by wireless transmission, represented by the dashed connection 48 to the temperature estimator 28. For the wireless transmission 48 is preferably used a low power transmission according to the so-called "Bluetooth" technique.

From these input values to the rotor temperature estimator 28 is determined a rotor temperature value $T_R$ which is fed to the voltage regulator unit 8.

In FIG. 4 the rotor temperature estimator 28 is supplied with a plurality of input values. However, it is not necessary to utilize all of those input quantities to determine the rotor temperature value $T_R$. There are several ways to determine the rotor temperature value $T_R$. The value can be estimated from inductor current and inductor voltage. The directly measured temperature at a critical point of the rotor can be directly used as a rotor temperature value $T_R$. Alternatively, both the temperature value estimated from inductor current and voltage and the directly measured value can be utilized, e.g. by using their mean value as the rotor temperature value $T_R$ and also cooling medium temperature and flow can be utilized to obtain a reliable rotor temperature value $T_R$. If rotor temperature values determined by the rotor temperature estimator 28 from different sets of input quantities become markedly different there is probably some defect that requires attention.

Analogously all input values to the stator temperature estimator 6 shown in FIG. 4 need not be utilized to determine the stator temperature value $T_S$. The temperature value $T_S$ can be estimated from e.g. the current and voltage values I and U. The temperature measured by the gauge 15 can be directly used as a stator temperature value $T_S$, or one could use the mean value of these two temperatures as stator temperature value $T_S$. In this case it is also possible to use the cooling medium temperature in the stator cooling circuit 14 to determine the stator temperature value $T_S$.

Temperature estimators suitable for use with the present invention are described in the above mentioned publication WO98/34312, and will not be further described here.

Depending on a rotor temperature value $T_R$ fed to the voltage regulator unit 8, the pump 36 and/or the cooler 38 of the rotor cooling circuit are controlled to produce the forced cooling of the rotor 46 adequate for the actual overload level, compare FIG. 1 showing how the overload curve referring to the rotor is raised to a higher level by forced cooling. This forced cooling thus improves the ability of the rotor 46 to thermally withstand overload states. Combined with the inherently good thermal overload capacity of the stator 2, the synchronous compensator according to the invention thus provides a very good overload capacity in over-excited operation.

To increase the flow in the rotor cooling circuit 34 the speed of the pump can be increased, or alternatively a second pump be connected to the system. To force the cooling, additional cooler capacity can be connected.

Another alternative possibility to realize forced cooling, is to switch the cooling circuit from a normal series arrangement to a parallel arrangement in the rotor winding by providing means therefor controlled by the voltage regulator unit.

In patent U.S. Pat. No. 3,652,880 is described water supply means for cooling the rotor of an electrical machine. By connecting a pump to this known means, the forced cooling according to the invention can be realized.

In FIG. 5 is schematically described an arrangement where an increased flow in a rotor 101 is achieved without use of a pump. To achieve normal flow, the cooling water is supplied at the entry 102 and let out at the exit 103 by controlling the valve 104. At forced cooling the valve 106 is opened to let cooling water out through the exit 105 which is located at a greater distance (radius r3) from the center line of the rotor than the first exit 103 (radius r2). In both cases the entry 102 is located at the radius r1. In this way the centrifugal forces are used to control and increase the pressure and thereby increase the flow.

Figure 6:
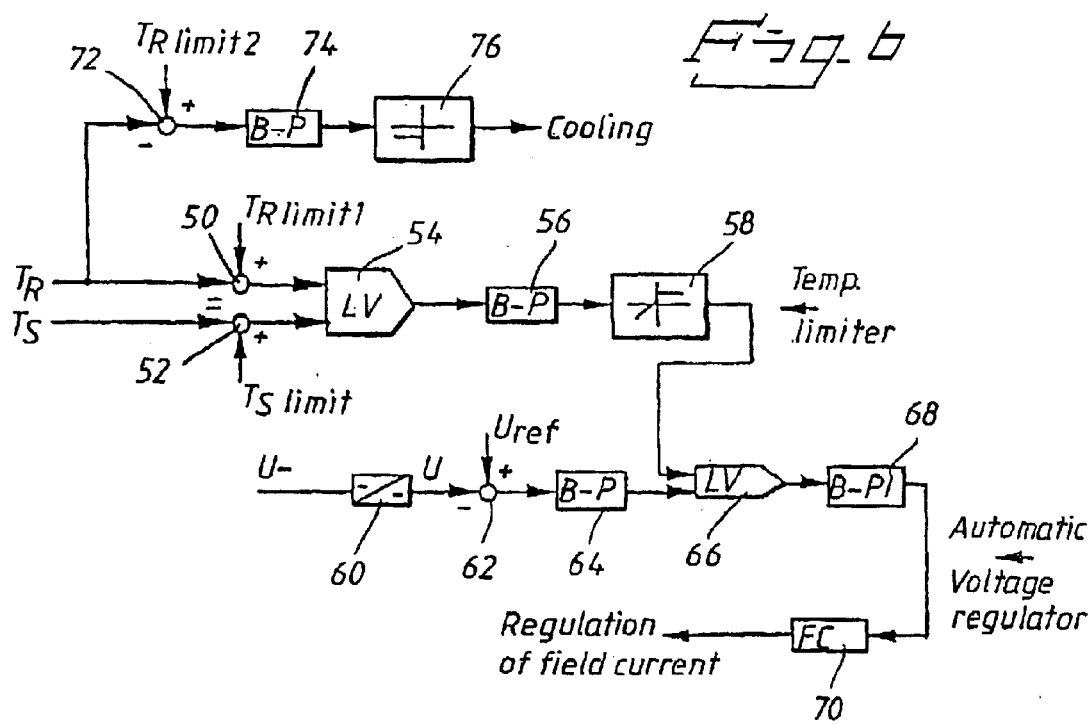
FIG. 6 shows in greater the detail function of the voltage regulating part of FIG. 4.

In FIG. 6 is shown a block diagram of one embodiment of the voltage regulator unit 8 in FIG. 4. In addition to the stator voltage U, the input values of the unit are the stator temperature value $T_S$ and the rotor temperature value $T_R$ determined in any of the ways described above. The operation of the regulator unit 8 is as follows.

The temperature values $T_R$ and $T_S$ are compared with predetermined limit values $T_{Rlimit1}$ and $T_{Slimit}$ at 50 and 52, respectively, in FIG. 6. The results of the comparisons are fed to a gate 54 and a subsequent signal processing unit 56 and unit 58 having a non-linear characteristic. The stator voltage U~ is in its turn fed to a converter 60 and the output voltage U from this is compared to a voltage reference value $U_{ref}$ at 62 in FIG. 6. The result of the comparison is fed to a signal processing unit 64 and to a gate 66 together with the signal from said unit 58. The output signal from the gate 66 is fed to a processing unit 68 having an integrating function and a trigger unit 70 for controlling the inductor current. If any of the predetermined limit values $T_{Rlimit1}$ or $T_{Slimit}$ is exceeded, the inductor current is reduced.

The rotor temperature value $T_R$ is compared at 72 with a second predetermined limit value $T_{Rlimit2}$. The result is fed to a signal processing unit 74 and an output unit 76 having a non-linear characteristic, the output signal of which will trigger forced cooling of the rotor if $T_R > T_{Rlimit2}$ by increasing the cooling water flow in the cooling system 34 or by connecting the cooler 38 to lower the water temperature as described above.

Suitable hysteresis should be introduced in the control of the forced cooling to avoid a situation where the forced cooling is repeatedly turned on and off.

Figure 7:
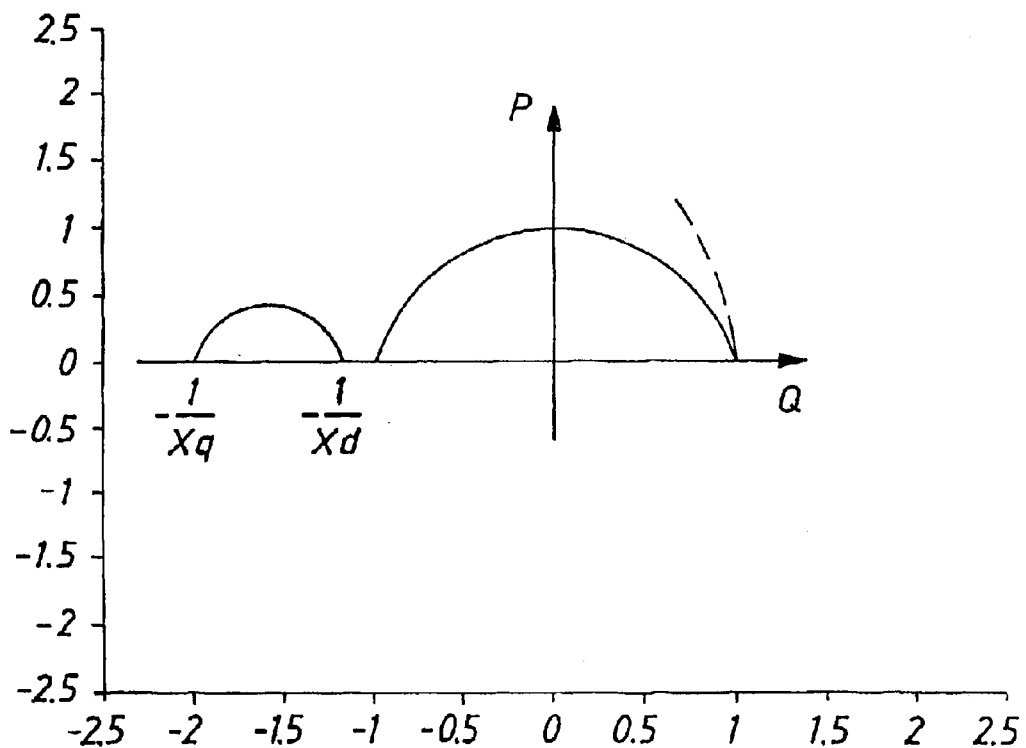
FIG. 7 shows a capability diagram in per unit based on the rating of the machine and at nominal voltage for a synchronous compensator.

FIG. 7 shows a capability diagram in per unit based on rated data and nominal voltage illustrating the limits for stationary operation of a synchronous machine. P denotes active power and Q reactive power. The semicircle with its center at the origin of coordinates corresponds to the maximum allowable stator temperature. The graph intersecting the semicircle at P=0, Q=1 corresponds to the maximum allowable rotor temperature at nominal rotor cooling. The smaller semicircle to the left corresponds to zero inductor current. The synchronous machine represented by FIG. 7 is designed for large short-circuit power, which also means that it is constructed with small synchronous reactance values $x_d$ and $x_q$. Operation of the synchronous compensator will occur along the Q-axis, viz. it produces or consumes reactive power.

A temporary enlargement of the range of operation of the synchronous compensator at under-excited operation means that it will operate in the region Q<-1 in the diagram. The maximum acceptable overload at under-excited operation is determined by the direct-axis synchronous reactances $x_d$ corresponding to the direction of a pole and the quadrature-axis synchronous reactances $x_q$ corresponding to the direction of the gap between two poles, i.e. depends on the design and dimensions of the machine. The synchronous compensator can never consume more reactive power than corresponding to $1/x_q$ in the diagram since this point is a stability limit.

At the point $-1/x_d$ in the diagram of FIG. 7 the exciting current is zero. To continue to the point $-1/x_q$ the machine is provided with a static feeder with two bridges to permit stationary operation with negative inductor current.

If $-1/x_d < -1$ the small semicircle in FIG. 7 will be located outside the larger semicircle. In the region between the two semicircles the synchronous compensator can be operated with feeders not delivering negative inductor current.

A temporary enlargement of the range of operation of the synchronous compensator at over-excited operation means that you will be in the region Q>1 in the diagram. To avoid that the rotor delimits the possibility of temporary enlargement of the range of operation, the rotor is provided with means for forced cooling as described above.

Figure 8:
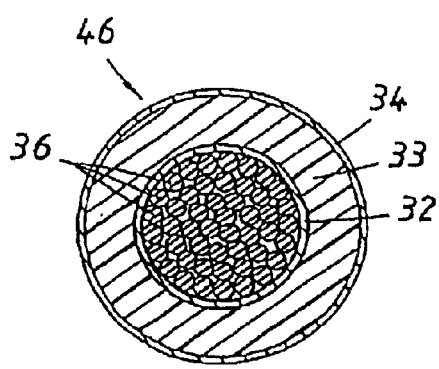
FIG. 8 shows a cross section of a high voltage cable of the type used in the present invention.

The cable 46 forming the windings of the machine is shown in cross section in FIG. 8 and is a high voltage cable of substantially the same type as that used for distribution, viz. a XLPE cable. The high voltage cable 46 comprises a conductive core with a number of strands 36. The conductor is surrounded by an insulating system with two semi-conductive layers 32, 34 disposed on each side of a solid insulation 33. The cable is flexible and the semi-conductive layers 32, 34 are substantially equipotential surfaces, which allow enclosing of the electric field so the external surface of the cable can be kept at substantially ground potential, a very important property when the cable is used as a winding in the iron core of an electric machine. The solid insulation 33 and the surrounding semiconductive layers 32, 34 are formed with an electric insulation strength exceeding 3 kV/mm, preferably exceeding 5 kV/mm. In that way the cable will be well suited for use as winding in a stator core for high voltages while maintaining the control of the electric field and without any risk of destroying electric discharges occurring.

By forming the stator winding of a rotating electric machine with so-called cable technology the stator will thus get a long thermal time constant, which means that it will have a very good ability to withstand temporary overloads. This property of the stator can, according to the invention, be used to temporarily enlarge the range of operation of a synchronous compensator, designed according to this technique at over-excited as well as under-excited operation, by forcing the rotor cooling when needed and by dimensioning the machine to make the synchronous reactance $x_q$ small and also providing the machine with a feeder which allows negative inductor current. In this way the range of operation of the synchronous compensator can be remarkably enlarged.

What is claimed is:

1. Method of operation of a synchronous compensator including a rotating electric machine including a rotor and a stator with at least one winding with solid insulation enclosing an electric field, the method comprising:

determining, to temporarily enlarge a range of operation of the synchronous compensator, parameters relevant for temperature conditions in the rotor; and forcing, at an over-excited operation, cooling of the rotor depending on a magnitude of a rotor temperature value determined from the parameters.

2. Method according to claim 1, wherein the machine is further configured to permit overload at an under-excited operation.

3. Method according to claim 2, further comprising:

determining parameters relevant for temperature conditions in the stator; and reducing inductor current if a critical stator temperature is exceeded during the over-excited or under-excited operation.

4. Method according to claim 1, wherein the machine is configured for large short-circuit power.

5. Method according to claim 1, wherein an inductor current is reduced if the rotor temperature value exceeds a predetermined first temperature limit value, and the cooling of the rotor is forced if the rotor temperature value exceeds a predetermined second temperature limit value that is lower than the first temperature limit value.

6. Method according to claim 1, wherein the cooling is forced by lowering a temperature of a cooling medium.

7. Method according to claim 1, wherein the cooling is forced by increasing a flow of a cooling medium.

8. Method according to claim 1, wherein in the forcing, the rotor temperature value is determined from one or more of the parameters of inductor current, inductor voltage, temperature directly measured on the rotor, rotor cooling medium temperature, and cooling medium flow velocity.

9. Method according to claim 1, wherein the cooling is controlled at an actual overload so that a rotor temperature value will be equal to or less than a maximum allowable rotor temperature.

10. Synchronous compensator, comprising:
   a rotating electric machine with at least one winding with solid insulation enclosing an electric field; and
   measuring means for measuring parameters relevant for temperature conditions in the rotor; and
   means for forcing cooling of the rotor depending on a value of a rotor temperature value determined from said parameters during an over-excited operation of the electric machine.

11. Synchronous compensator according to claim 10, further comprising:
   a temperature estimator configured to determine a stator temperature value from one or more of parameters of stator current, stator voltage, sheet iron temperature directly measured on the stator, temperature of a stator cooling medium, and flow velocity of the stator cooling medium.

12. Synchronous compensator according to claim 10, wherein said means for forcing cooling forces the cooling by lowering a temperature of a cooling medium.

13. Synchronous compensator according to claim 10, wherein said means for forcing cooling forces the cooling by increasing a flow of a cooling medium.

14. Synchronous compensator according to claim 10, wherein said means for forcing cooling comprises switching means for switching a cooling circuit from a normal series arrangement in the rotor to a parallel arrangement.

15. Synchronous compensator according to claim 12, wherein the cooling medium is a liquid.

16. Synchronous compensator according to claim 10, further comprising:
   a temperature estimator configured to determine a critical rotor temperature value from one or more of measured rotor temperature, temperature of a rotor cooling medium, and flow velocity of the rotor cooling medium.

17. Synchronous compensator according to claim 16, further comprising:
   communication equipment configured for wireless transmission of measured values from a temperature gauge located on the rotor to the temperature estimator.

18. Synchronous compensator according to claim 17, wherein the communication equipment is configured for transmission of measured values from a temperature gauge located on the rotor by Bluetooth technology.

19. Synchronous compensator according to claim 10, further comprising:
   a winding comprising a flexible cable with an electrically conducting core surrounded by an insulating system of two semiconductive layers with intermediate solid insulation.

* * * * *